United States Patent
Igarashi et al.

(10) Patent No.: US 12,210,085 B2
(45) Date of Patent: Jan. 28, 2025

(54) ANGLE MEASURING DEVICE AND ANGLE MEASURING METHOD

(71) Applicant: ALPS ALPINE CO., LTD., Tokyo (JP)

(72) Inventors: Taiki Igarashi, Miyagi (JP); Mitsunobu Inoue, Miyagi (JP); Naoya Shimada, Miyagi (JP); Daisuke Takai, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 336 days.

(21) Appl. No.: 17/818,494

(22) Filed: Aug. 9, 2022

(65) Prior Publication Data

US 2023/0072262 A1   Mar. 9, 2023

(30) Foreign Application Priority Data

Sep. 7, 2021 (JP) .................................. 2021-145240

(51) Int. Cl.
*G01S 13/42* (2006.01)
*G01S 7/40* (2006.01)
*G01S 13/32* (2006.01)

(52) U.S. Cl.
CPC .............. *G01S 13/42* (2013.01); *G01S 7/403* (2021.05); *G01S 13/32* (2013.01)

(58) Field of Classification Search
CPC ........... G01S 13/42; G01S 7/403; G01S 13/32
See application file for complete search history.

(56) References Cited

U.S. PATENT DOCUMENTS

| 11,183,772 | B2 * | 11/2021 | Lee | .................... G01S 13/524 |
| 2008/0095384 | A1 * | 4/2008 | Son | ........................ G10L 25/87 |
| | | | | 704/E11.005 |
| 2010/0066590 | A1 * | 3/2010 | Brown | ................ H01Q 3/2605 |
| | | | | 342/147 |

(Continued)

FOREIGN PATENT DOCUMENTS

| JP | H02-245683 | 10/1990 |
| JP | H08-201498 | 8/1996 |
| JP | 3640788 B2 * | 4/2005 |

OTHER PUBLICATIONS

Japanese Office Action for 2021-145240 mailed on Oct. 22, 2024.

*Primary Examiner* — Timothy A Brainard
*Assistant Examiner* — Ismaaeel A. Siddiquee
(74) *Attorney, Agent, or Firm* — IPUSA, PLLC (57) ABSTRACT

An angle measuring device includes an antenna device having antenna elements equally spaced along a first axis and a second axis, respectively, a selecting unit that selects phase differences with which a variance thereof becomes a predetermined value or less, from a plurality of phase differences of signals received from a transmission device by the antenna elements, an azimuth angle computing unit that computes an azimuth angle of the transmission device from a ratio of a first phase difference between signals received by two antenna elements spaced by a predetermined distance along the first axis and a second phase difference between signals received by two antenna elements space by the predetermined distance along the second axis, and an elevation angle computing unit that computes an elevation angle of the transmission device, based on the computed azimuth angle and the first or second phase difference.

16 Claims, 6 Drawing Sheets

(56) References Cited

U.S. PATENT DOCUMENTS

2016/0285172 A1* 9/2016 Kishigami .......... G01S 13/4463
2020/0256973 A1* 8/2020 Kim ...................... G01S 13/931
2022/0091230 A1* 3/2022 Arakawa ............... G01S 13/931

* cited by examiner

ANGLE MEASURING DEVICE AND ANGLE MEASURING METHOD

CROSS-REFERENCE TO RELATED APPLICATIONS

This application is based upon and claims priority to Japanese Patent Application No. 2021-145240, filed on Sep. 7, 2021, the entire contents of which are incorporated herein by reference.

BACKGROUND OF THE INVENTION

1. Field of the Invention

The present disclosure relates to angle measuring devices and angle measuring methods.

2. Description of the Related Art

An example of a conventional arrival angle measuring device measures an arrival angle of a radio wave, based on signals received by a plurality of antennas having a planar arrangement. An azimuth angle of the radio wave is determined based on a phase difference of the signals received along two axial directions, as described in Japanese Laid-Open Patent Publication No. H02-245683, for example.

However, the conventional arrival angle measuring device does not take into consideration a multipath of the received signals, and thus cannot reduce the effects of the multipath. For this reason, a measurement accuracy of the arrival angle measuring device may greatly deteriorate due to the multipath.

SUMMARY OF THE INVENTION

Accordingly, one object of the present disclosure is to provide an angle measuring device and an angle measuring method having a high measurement accuracy, even when a multipath occurs.

An angle measuring device according to one aspect of the embodiments includes an antenna device configured to receive a signal transmitted from a transmission device, and including a plurality of antenna elements that are equally spaced along a first axis and a second axis, respectively; and a processor configured to perform a process including selecting phase differences with which a variance thereof becomes less than or equal to a predetermined value, from a plurality of phase differences of signals received from the transmission device by the plurality of antenna elements, computing an azimuth angle of the transmission device from a ratio of a first phase difference and a second phase difference among the phase differences selected by the selecting, wherein the first phase difference is a phase difference between signals received by a first antenna element and a second antenna element located at a predetermined distance from the first antenna element along the first axis, and the second phase difference is a phase difference between signals received by the first antenna element and a third antenna element located at the predetermined distance from the first antenna element along the second axis, and computing an elevation angle of the transmission device, based on the azimuth angle computed by the computing the azimuth angle and the first phase difference or the second phase difference.

Other objects and further features of the present invention will be apparent from the following detailed description when read in conjunction with the accompanying drawings.

DESCRIPTION OF THE PREFERRED EMBODIMENTS

Embodiments and modifications of the angle measuring device and the angle measuring method according to the present disclosure will be described in the following.

Embodiments

Figure 1:
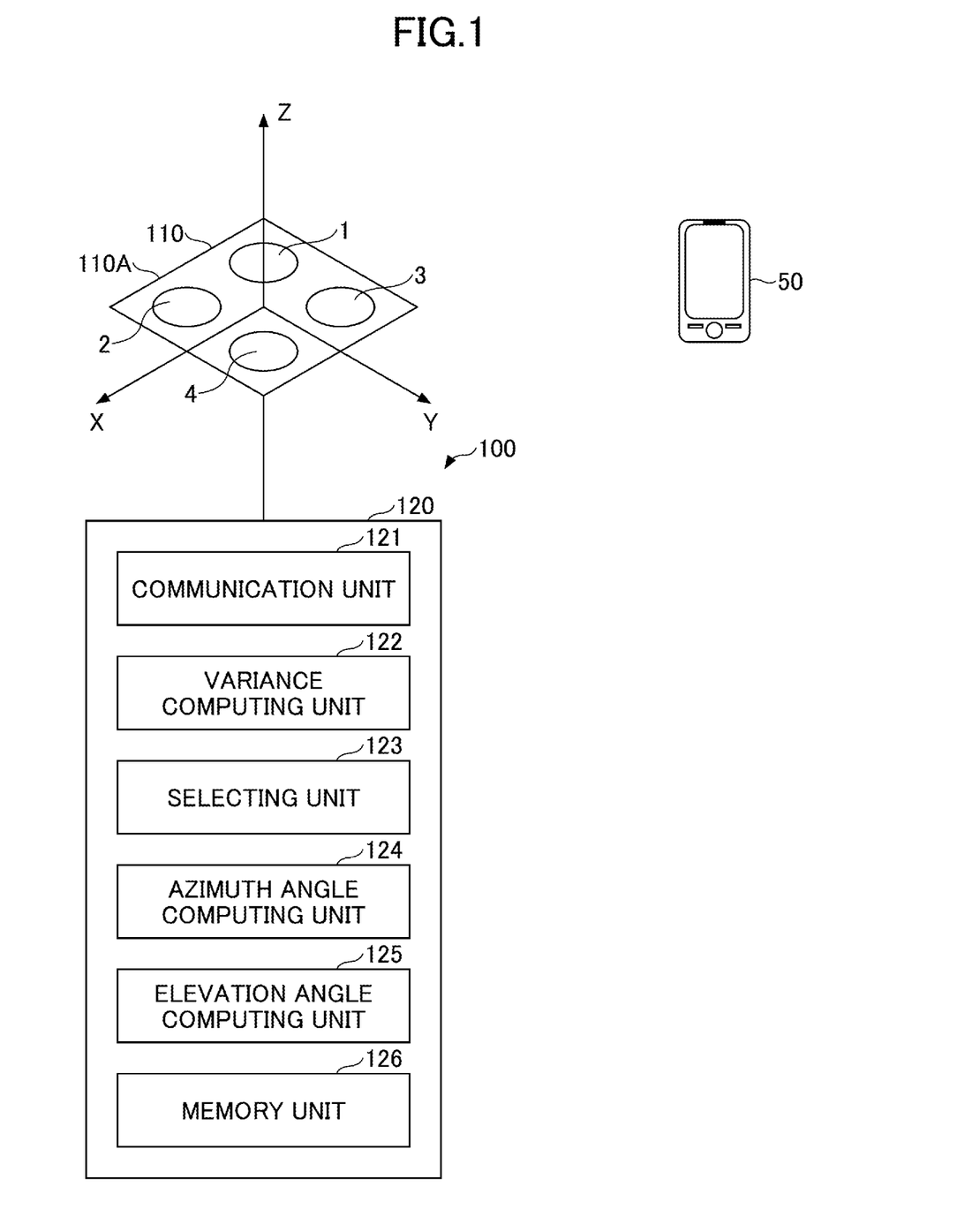
FIG. 1 is a diagram illustrating an angle measuring device 100 according to one embodiment.

FIG. 1 is a diagram illustrating the angle measuring device 100 according to one embodiment. An operation of the angle measuring device 100 will be described using the XYZ coordinate system as an example. In this case, an X-axis is an example of a first axis, a Y-axis is an example of a second axis, and a Z-axis is an example of a third axis that are perpendicular to one another.

FIG. 1 illustrates a smartphone 50 together with the angle measuring device 100. The smartphone 50 is an example of a transmission device that transmits a signal. The angle measuring device 100 receives the signal transmitted from the smartphone 50, and measures an azimuth angle and an elevation angle of the smartphone 50 with respect to the angle measuring device 100. The signal transmitted from the smartphone 50 may be a continuous wave (CW) signal, for example. The angle measuring device 100 may also measure a position of the smartphone 50 from the measured azimuth angle and elevation angle, by performing a distance measuring operation. In this case, the angle measuring device 100 also functions as a distance measuring device that may perform a known distance measuring operation.

The angle measuring device 100 includes the antenna device 110, and the controller 120. The antenna device 110 includes a board (or substrate) 110A, and antenna elements 1 through 4 provided on the board 110A. The board 110A may be an insulating board made of an insulating material, for example.

The antenna elements 1 through 4 are electrically connected to the controller 120. The antenna elements 1 through 4 may be patch antennas, for example, that are provided on a first surface of the board 110A, on the +Z-side of the board 110A and parallel to the XY-plane. A distance (or spacing) between the antenna element 1 and the antenna element 2 along the X-direction, a distance (or spacing) between the antenna element 3 and the antenna element 4 along the X-direction, a distance (or spacing) between the antenna element 1 and the antenna element 3 along the Y-direction, and a distance (or spacing) between the antenna element 2 and the antenna element 4 along the Y-direction are all the same, and are less than or equal to ½ the wavelength of the signal transmitted from the smartphone 50. The antenna elements 1 through 4 can receive the CW signal transmitted from the smartphone 50.

The antenna elements 1 through 4 are an example of a plurality of antenna elements. The four antenna elements 1 through 4 are arranged along the X-axis and the Y-axis. Among the antenna elements 1 through 4, each pair of two mutually adjacent antenna elements along the X-direction, and each pair of two mutually adjacent antenna elements along the Y-direction, are equally spaced along the X-direction and the Y-direction, respectively. The antenna device 110 includes the four antenna elements 1 through 4 in the example illustrated in FIG. 1, however, the antenna device 110 may include at least three antenna elements.

The antenna element 1 is an example of a first antenna element. The antenna element 2 is an example of a second antenna element located at a position that is a predetermined distance from the antenna element 1 along the X-direction. The antenna element 3 is an example of a third antenna element located at a position that is the predetermined distance from the antenna element 1 along the Y-direction. The distance between the antenna element 1 and the antenna element 2 along the X-direction, is the same as the distance between the antenna element 1 and the antenna element 3 along the Y-direction. The antenna device 110 may include a ground plate that is held at a ground potential, and is provided on a second surface of the board 110A, on the −Z-side of the board 110A and parallel to the XY-plane. The first surface and the second surface of the board 110A are provided on mutually opposite sides (for example, top and bottom) of the board 110A.

The controller 120 includes a communication unit 121, a variance computing unit 122, a selecting unit 123, an azimuth angle computing unit 124, an elevation angle computing unit 125, and a memory unit 126. The communication unit 121 includes an analog front end (AFE), an analog-to-digital converter (ADC), or the like, and outputs the signal received from the smartphone 50 to the azimuth angle computing unit 124.

Functions of the variance computing unit 122, the selecting unit 123, the azimuth angle computing unit 124, the elevation angle computing unit 125, and the memory unit 126 may be implemented in a microcomputer (or computer) including a central processing unit (CPU), a random access memory (RAM), a read only memory (ROM), an internal bus, or the like, for example. The CPU is an example of a processor, and the RAM and the ROM are examples of a memory. The variance computing unit 122, the selecting unit 123, the azimuth angle computing unit 124, and the elevation angle computing unit 125 may be regarded as functional blocks representing the functions performed by one or more programs executed by the microcomputer. The memory unit 126 may be regarded as a functional block representing the function of the memory of the microcomputer.

For example, with respect to the antenna element 1 and the antenna element 2 that are mutually adjacent along the X-direction, the variance computing unit 122 determines a phase difference between the signals received from the smartphone 50 by the antenna element 1 and the antenna element 2 when a frequency of the signal transmitted from the smartphone 50 is varied to a plurality of frequencies included in a single frequency band, and computes a variance of the phase difference between the signals determined for the plurality of frequencies. The variance computing unit 122 varies a distance between the smartphone 50 and the antenna device 110, and computes the variance of the phase difference between the signals determined for the plurality of frequencies, at a plurality of positions respectively having a different distance from the smartphone 50 to the antenna device 110.

The variance computing unit 122 computes the variance of the phase difference between the signals determined for the plurality of frequencies, at the plurality of positions respectively having the different distance from the smartphone 50 to the antenna device 110, similarly with respect to the phase difference between the signals received from the smartphone 50 by the antenna element 3 and the antenna element 4 that are mutually adjacent along the X-direction, the phase difference between the signals received from the smartphone 50 by the antenna element 1 and the antenna element 3 that are mutually adjacent along the Y-direction, and the phase difference between the signals received from the smartphone 50 by the antenna element 2 and the antenna element 4 that are mutually adjacent along the Y-direction. A standard deviation of the phase differences of the signals may be computed in place of the variance of the phase differences of the signals.

In a case where the antenna device 110 includes a large number of antenna elements, the variance computing unit 122 computes the variance of the phase differences of the signals determined for the plurality of frequencies, with respect to each pair of antenna elements that are mutually separated by the predetermined distance along the X-direction. In this case, each pair of antenna elements that are mutually separated by the predetermined distance along the X-direction may, or may not be adjacent to each other. Further, the variance computing unit 122 computes the variance of the phase differences of the signals determined for the plurality of frequencies, with respect to each pair of antenna elements that are mutually separated by the predetermined distance along the Y-direction. In this case, each pair of antenna elements that are mutually separated by the predetermined distance along the Y-direction may, or may not be adjacent to each other.

The selecting unit 123 selects phase differences with which the variance of the phase differences of the signals computed by the variance computing unit 122 becomes less than or equal to a threshold value. More particularly, the selecting unit 123 selects the phase differences computed at the positions where the variance of the phase differences of the signals computed by the variance computing unit 122 becomes less than or equal to the threshold value. The threshold value is an example of a predetermined value.

In the case where the antenna device 110 includes the four antenna elements 1 through 4, the selecting unit 123 selects the phase differences computed at the positions where the variance of the phase differences of the signals computed by the variance computing unit 122 becomes less than or equal to the threshold value, from among a plurality of phase differences of the signals received by the antenna elements 1 through 4 from the smartphone 50.

The azimuth angle computing unit 124 computes an azimuth angle representing the position of the smartphone 50, based a signal obtained by the communication unit 121 from the CW signal received by the antenna elements 1 through 4.

The azimuth angle computing unit 124 selects a combination of three antenna elements that are candidates for a first antenna element, a second antenna element, and a third antenna element that receive the signals from which the phase differences selected by the selecting unit 123 are determined. The combination of the three antenna elements includes one antenna element (that is, a candidate of the first antenna element), and two antenna elements (that is, candidates of the second antenna element and the third antenna element) satisfying a relationship such that the two antenna elements are arranged at equal distances from the one antenna element along the X-direction and the Y-direction, respectively. In other words, one of the two antenna elements (that is, the candidate of the second antenna element) is located at the predetermined distance from the one antenna element along the X-direction, and the other of the two antenna elements (that is, the candidate of the third antenna element) is located at the predetermined distance from the one antenna element along the Y-direction.

The azimuth angle computing unit 124 selects the combination of three antenna elements having a signal reception intensity falling within a predetermined rank from a top rank, from combinations of the three antenna elements, and regards the three antenna elements of the selected combination as the first antenna element, the second antenna element, and the third antenna element. The phase difference between the signals received by the first antenna element and the second antenna element is an example of a first phase difference, and the phase difference between the signals received by the first antenna element and the third antenna element is an example of a second phase difference.

The azimuth angle computing unit 124 computes the azimuth angle, using the first phase difference and the second phase difference that are determined from the three antenna elements that are selected as the first antenna element, the second antenna element, and the third antenna element. A method for computing the azimuth angle will be described later with reference to FIG. 2.

The elevation angle computing unit 125 computes an elevation angle representing the position of the smartphone 50, based on the azimuth angle and the first phase difference or the second phase difference computed by the azimuth angle computing unit 124. A method for computing the elevation angle will be described later with reference to FIG. 2.

The memory unit 126 stores the programs, data, or the like required by the variance computing unit 122, the selecting unit 123, the azimuth angle computing unit 124, and the elevation angle computing unit 125 to perform the processes described above or the processes that will be described below.

Figure 2:
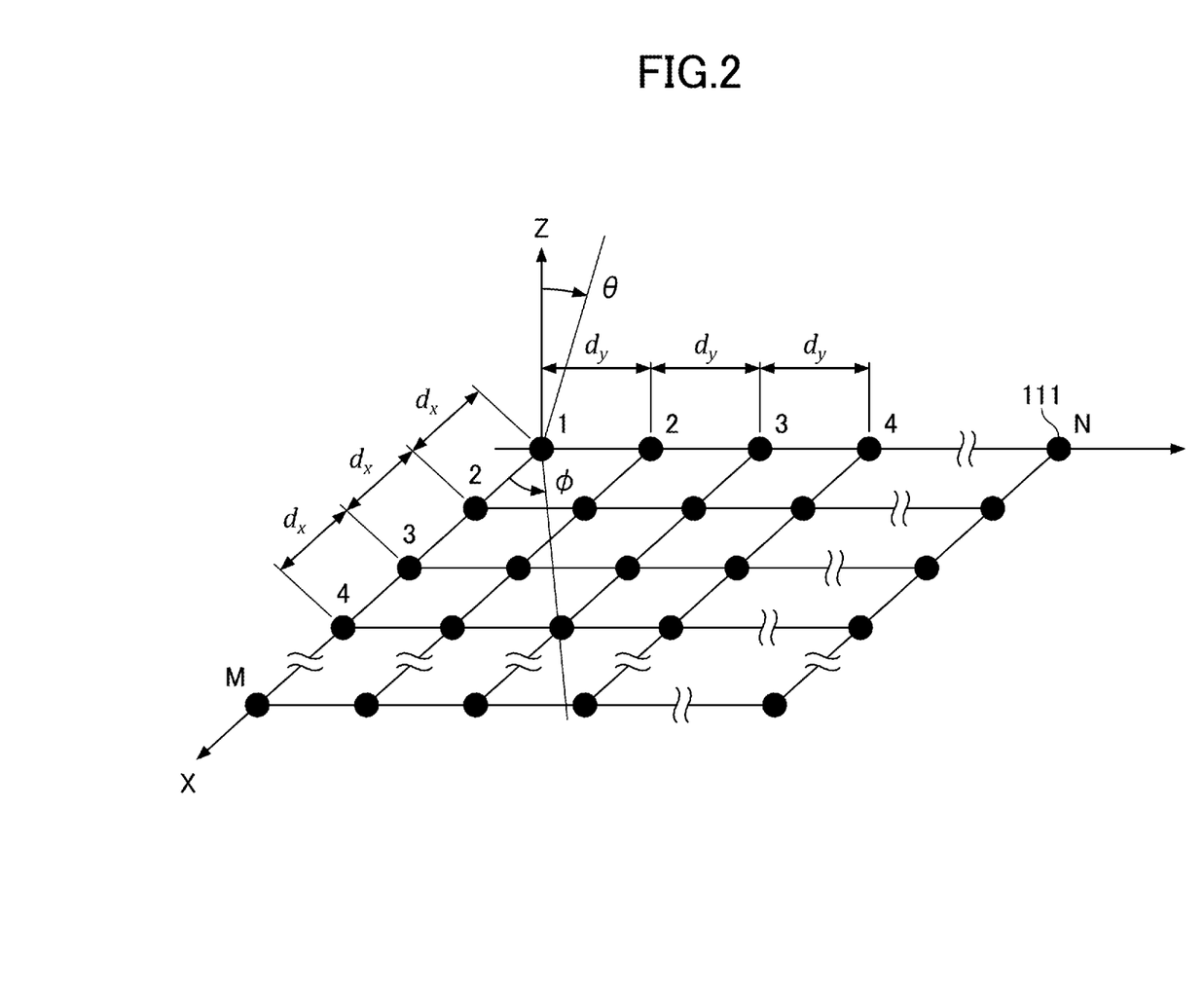
FIG. 2 is a diagram for explaining methods for computing an azimuth angle and an elevation angle.

FIG. 2 is a diagram for explaining the methods for computing the azimuth angle and the elevation angle. FIG. 2 illustrates a plurality of antenna elements 111 arranged in an array along the X-axis and the Y-axis. In this example, M antenna elements 111 are arranged at equal distances denoted by $d_x$ along the X-direction, where M is an integer of greater than or equal to 2. In addition, N antenna elements 111 are arranged at equal distances denoted by $d_y$ along the Y-direction, where N is an integer greater than or equal to 2. The antenna elements 111 are equally spaced in the X-direction and the Y-direction, such that the distance $d_x$ is equal to the distance $d_y$. The antenna elements 111 have a configuration similar to those of the antenna elements 1 through 4 illustrated in FIG. 1, but for the sake of simplicity and convenience, the antenna elements 111 are indicated by black circular marks in FIG. 2.

As an example, the antenna element 111 located at a first coordinate (M=1) along the X-direction and a first coordinate (N=1) along the Y-direction is an example of the first antenna element. In addition, the antenna element 111 located at a second coordinate (M=2) along the X-direction and the first coordinate (N=1) along the Y-direction is an example of the second antenna element. Further, the antenna element 111 located at the first coordinate (M=1) along the X-direction and a second coordinate (N=2) along the Y-direction is an example of the third antenna element.

The methods for computing an azimuth angle ø and an elevation angle θ representing the direction of the smartphone 50 will be described for the case where the three antenna elements 111 illustrated in FIG. 2, namely, the first antenna element, the second antenna element, and the third antenna element receive the signal from the smartphone 50.

When a phase difference between the signals received by the first antenna element and the second antenna element is denoted by $\beta_x$, a phase difference between the signals received by the first antenna element and the third antenna element is denoted by $\beta_y$, and a wavelength of the signal is denoted by $\lambda$, the phase differences $\beta_x$ and $\beta_y$ can be expressed by the following formulas (1) and (2). The phase difference $\beta_x$ is an example of the first phase difference, and the phase difference $\beta_y$ is an example of the second phase difference.

$$\beta_x = \frac{2\pi}{\lambda} d_x \cos\phi \sin\theta \qquad (1)$$

$$\beta_y = \frac{2\pi}{\lambda} d_y \sin\phi \sin\theta \qquad (2)$$

The following formulas (3) through (6) can be derived when the formulas (1) and (2) are solved for the azimuth angle ø and the elevation angle θ.

$$\theta = \sin^{-1}\left(\frac{\beta_x}{2\pi} \cdot \frac{\lambda}{d_x} \cdot \frac{1}{\cos\phi}\right) \qquad (3)$$

$$\phi = \cos^{-1}\left(\frac{\beta_x}{2\pi} \cdot \frac{\lambda}{d_x} \cdot \frac{1}{\sin\theta}\right) \qquad (4)$$

$$\theta = \sin^{-1}\left(\frac{\beta_y}{2\pi} \cdot \frac{\lambda}{d_y} \cdot \frac{1}{\sin\phi}\right) \qquad (5)$$

$$\phi = \sin^{-1}\left(\frac{\beta_y}{2\pi} \cdot \frac{\lambda}{d_y} \cdot \frac{1}{\sin\theta}\right) \qquad (6)$$

From the formulas (1) and (2), a ratio of the phase difference $\beta_y$ with respect to the phase difference $\beta_x$ can be expressed by the following formula (7).

$$\frac{\beta_y}{\beta_x} = \frac{\frac{2\pi}{\lambda} d_y \sin\phi \sin\theta}{\frac{2\pi}{\lambda} d_x \cos\phi \sin\theta} \qquad (7)$$

Because $d_x = d_y$, the following formula (8) can be derived from the formula (7), and the azimuth angle ø can be determined by transforming the formula (8) into the following formula (9).

$$\frac{\beta_y}{\beta_x} = \frac{\sin\phi}{\cos\phi} = \tan\phi \qquad (8)$$

$$\phi = \tan^{-1}\left(\frac{\beta_y}{\beta_x}\right) \qquad (9)$$

By using the azimuth angle ø determined from the formula (9), the elevation angle θ can be determined from either one of the formula (3) or the formula (5). The phase difference $\beta_x$ may be used when computing the elevation angle $\theta$ from the formula (3), and the phase difference $\beta_y$ may be used when computing the elevation angle $\theta$ from the formula (5).

Figure 3A:
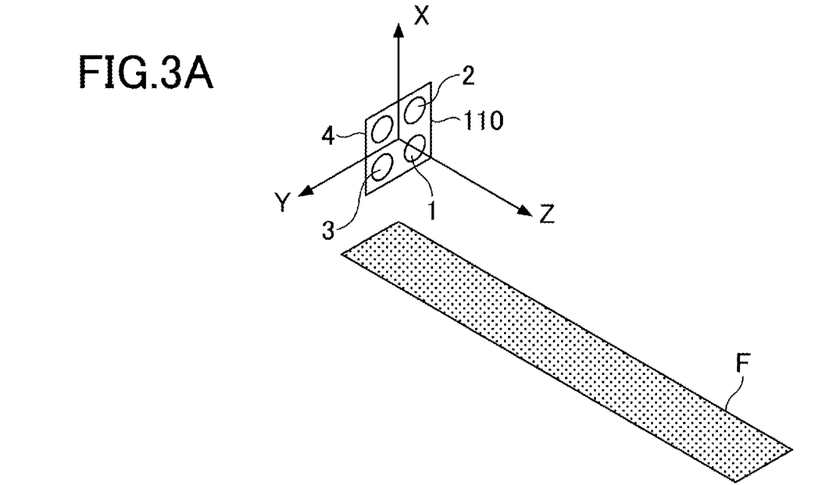
FIG. 3A, FIG. 3B, and FIG. 3C are diagrams illustrating an antenna device 110 and a variance of phase difference.
Figure 3B:
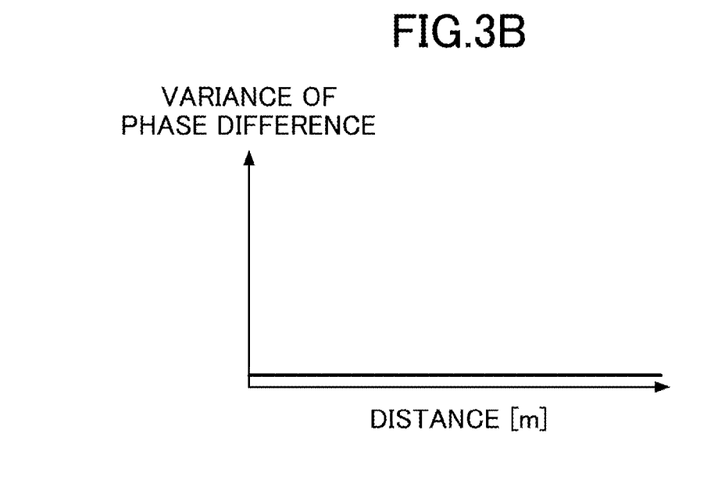
Figure 3C:
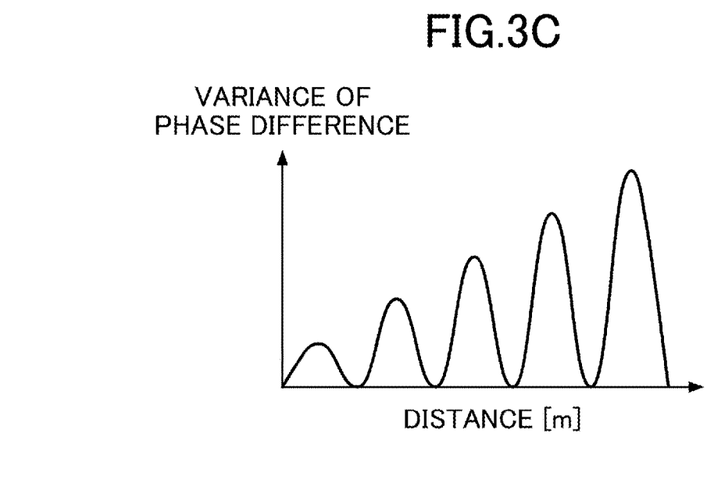

FIG. 3A through FIG. 3C are diagrams illustrating the antenna device 110 and the variance of phase difference. As illustrated in FIG. 3A, the antenna device 110 is installed in an upright (or vertical) state on a horizontal floor F. In this example, it is assumed that the antenna device 110 includes the plurality of antenna elements 111, as illustrated in FIG. 2. In FIG. 3A, the antenna device 110 is located at an origin of the XYZ coordinate system, with the +X-direction corresponding to the vertical upward direction, the Y-direction corresponding to the horizontal direction, and the +Z-direction corresponding to a direction away from the antenna device 110 along a surface of the floor F.

The variance of the phase difference between the signals received from the smartphone 50 by each of the two pairs of antenna elements 111, while the frequency of the signal transmitted from the smartphone 50 is varied to the plurality of frequencies at the plurality of positions where the distances from the smartphone 50 to the antenna device 110 are different, is computed. In addition, the plurality of frequencies are set to frequencies in a 2.4 GHz band (2.4 GHz to 2.48 GHz), for example. The variance is computed for the phase differences determined for the plurality of frequencies in the 2.4 GHz band, at each of the plurality of positions where the distances from the smartphone 50 to the antenna device 110 are different.

The variance of the phase difference between the signals is computed for each pair of antenna elements 111, by extracting a plurality of pairs of antenna elements 111 respectively formed by two antenna elements 111 arranged along the X-direction, and extracting a plurality of pairs of antenna elements 111 respectively formed by two antenna elements 111 arranged along the Y-direction, from among an array of M×N antenna elements 111.

For comparison purposes, FIG. 3B illustrates the variance of the phase difference between the signals in the absence of the floor F. On the other hand, FIG. 3C illustrates the variance of the phase difference between the signals in the presence of the floor F. In FIG. 3B and FIG. 3C, the ordinate indicates the variance of the phase difference between the signals, and the abscissa indicates the distance from the smartphone 50 to the antenna device 110. In the comparison example illustrated in FIG. 3B, the variance hardly varies according to the distance, and an approximately constant value is observed for the variance. On the other hand, in the embodiment illustrated in FIG. 3C, the variance varies, that is, periodically increases and decreases according to the distance.

From the computation result illustrated in FIG. 3C, it was found that the pairs of antenna elements 111 for which the variance of the phase difference between the signals is large are mostly the pairs of antenna elements 111 that are mutually separated by the predetermined distance along the X-direction. It was also found that the variance of the phase difference between the signals is relatively small for the pairs of antenna elements 111 that are mutually separated by the predetermined distance along the Y-direction. It may be regarded from these findings that a multipath is generated by the signal transmitted from the smartphone 50, reflected from the surface of the floor F, and received by the antenna elements 111. It may be regarded that the variance of the phase difference between the signals increases because the multipath signal reflected from the surface of the floor F is received by the pair of antenna elements 111 that are mutually separated by the predetermined distance along the X-direction.

In many cases, the floor F is present at a site where the angle measuring device 100 is provided. When the floor F is present, the phase difference between the signals becomes large due to the multipath effect, but when the phase difference becomes large, angle errors of the azimuth angle ø and the elevation angle $\theta$ that are finally determined may become large.

For this reason, when determining the azimuth angle ø and the elevation angle $\theta$, the angle measuring device 100 uses the phase differences of the signals with which the variance of the phase differences becomes less than or equal to the threshold value. The selecting unit 123 selects the phase differences, from among the phase difference between the signals received by each pair of antenna elements 111 mutually separated by the predetermined distance along the X-direction, and the phase difference between the signals received by each pair of antenna elements 111 mutually separated by the predetermined distance along the Y-direction, with which the variance of the phase differences becomes less than or equal to the threshold value.

Further, the azimuth angle computing unit 124 computes the azimuth angle ø using the phase difference between the signals received by the first antenna element and the second antenna element that are arranged at the predetermined distance along the X-direction, and the phase difference between the signals received by the first antenna element and the third antenna element that are arranged at the predetermined distance along the Y-direction, from among the phase difference between the signals received by each pair of antenna elements 111 mutually separated by the predetermined distance along the X-direction, and the phase difference between the signals received by each pair of antenna elements 111 mutually separated by the predetermined distance along the Y-direction.

The phase difference between the signals received by the first antenna element and the second antenna element that are arranged at the predetermined distance along the X-direction, is an example of the first phase difference. On the other hand, the phase difference between the signals received by the first antenna element and the third antenna element that are arranged at the predetermined distance along the Y-direction, is an example of the second phase difference.

Further, the elevation angle computing unit 125 computes the elevation angle $\theta$ based on the azimuth angle ø computed by the azimuth angle computing unit 124, and the above described phase difference that is the example of the first phase difference or the above described phase difference that is the example of the second phase difference.

Figure 4A:
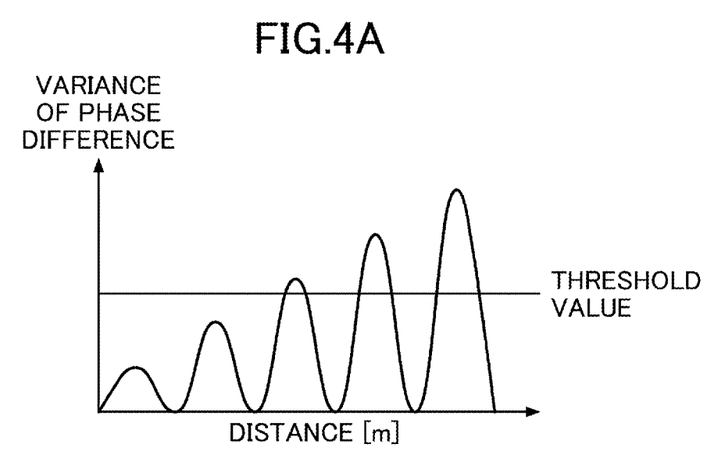
FIG. 4A, FIG. 4B, FIG. 4C, and FIG. 4D are diagrams illustrating the variance of phase difference, and a distribution of angle errors for computed azimuth angle ø and elevation angle θ.
Figure 4B:
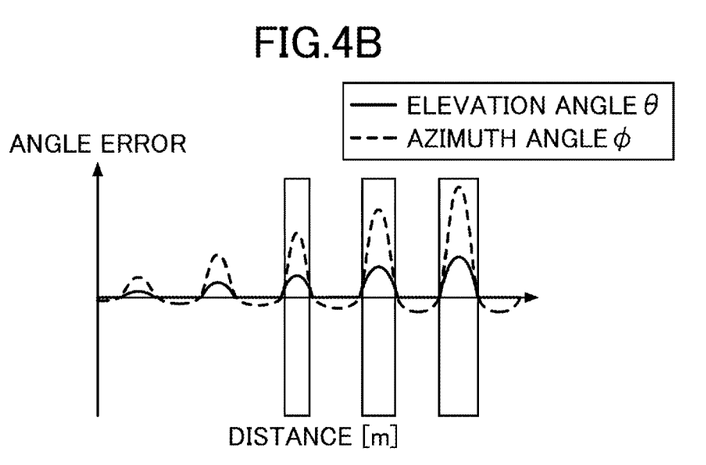

FIG. 4A through FIG. 4D are diagrams illustrating the variance of phase difference, and a distribution of the angle errors for the computed azimuth angle ø and elevation angle $\theta$. FIG. 4A illustrates a distribution of the variance of phase difference with respect to the distance. FIG. 4B illustrates a distribution of the angle errors of the azimuth angle ø and the elevation angle $\theta$ computed from the phase difference used to compute the variance of phase difference illustrated in FIG. 4A, with respect to the distance. The angle errors are errors of the computed azimuth angle ø and elevation angle $\theta$, with respect to the actual azimuth angle ø and elevation angle $\theta$, respectively.

Figure 4C:
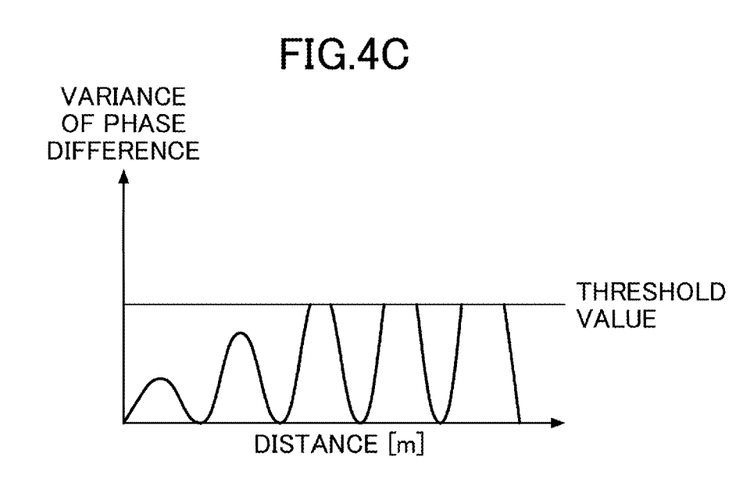
Figure 4D:
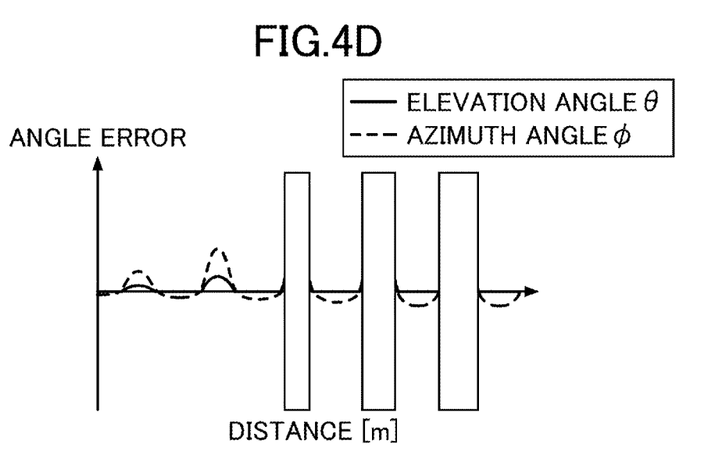

In addition, FIG. 4C illustrates the variance of phase difference, that is less than or equal to the threshold value, among the variances illustrated in FIG. 4A. FIG. 4D illustrates the distribution of the angle errors of the azimuth angle ø and elevation angle θ computed from the phase differences used to compute the variance of phase difference illustrated in FIG. 4C, with respect to the distance. The threshold value is the example of the predetermined value, and is an upper limit value for reducing an increase of the variance of the phase difference caused by the multipath generated due to the signal that is transmitted from the smartphone 50 and is reflected from the floor F. However, the cause of the multipath is not limited to reflection from the floor F, and the multipath may be caused by a reflection from a wall, a ceiling, or the like.

As illustrated in FIG. 4A, the distribution of the variance of the phase difference periodically increases and decreases according to the distance. This distribution is the same as the distribution illustrated in FIG. 3C. When the azimuth angle ø and the elevation angle θ are computed using the phase differences at the distances where the variance is large, the angle errors become large as illustrated in FIG. 4B. In FIG. 4B, sections surrounded by three rectangles indicate the sections where the variance of the phase difference become greater than the threshold value in FIG. 4A.

On the other hand, in FIG. 4C, only the variance of the phase difference, less than or equal to the threshold value, is selected by the selecting unit 123. More particularly, the selecting unit 123 decimates (or thins) the phase differences at the distances where the variance of the phase difference greater than the threshold value are computed, thereby selecting the variance at the distances where the variance of the phase difference, less than or equal to the threshold value, are computed.

Moreover, the angle errors of the azimuth angle ø computed by the azimuth angle computing unit 124 and the elevation angle θ computed by the elevation angle computing unit 125, from the phase differences used to compute the variance of the phase difference illustrated in FIG. 4C, become as illustrated in FIG. 4D. In FIG. 4D, the values of the azimuth angle φ and the elevation angle θ in the three sections where the variance of the phase difference is greater than the threshold value in FIG. 4A are decimated, thereby reducing the angle errors when compared to FIG. 4B.

Figure 5:
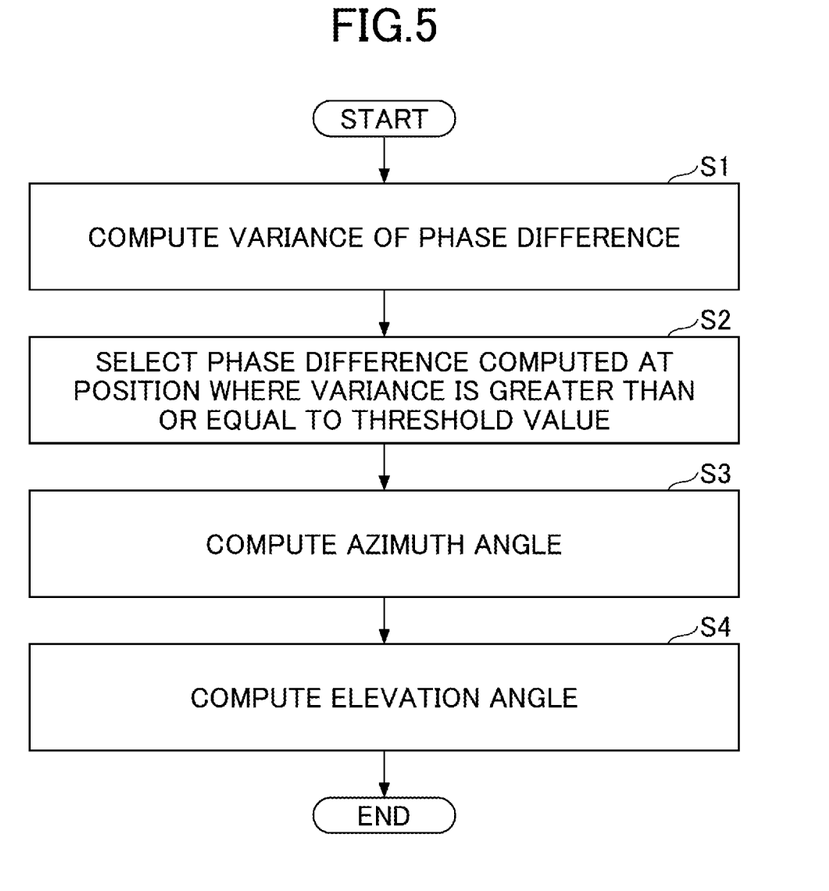
FIG. 5 is a flow chart illustrating a process performed by a variance computing unit 122, a selecting unit 123, an azimuth angle computing unit 124, and an elevation angle computing unit 125 of a controller 120.

FIG. 5 is a flow chart illustrating a process performed by the variance computing unit 122, the selecting unit 123, the azimuth angle computing unit 124, and the elevation angle computing unit 125 of the controller 120. The process illustrated in FIG. 5 is performed according to one embodiment of the angle measuring method.

When the process illustrated in FIG. 5 starts, the variance computing unit 122 computes the variance of the phase difference (step S1). Hence, data of the variance of the phase difference illustrated in FIG. 4A, for example, is created.

From the variance of the phase difference computed in step S1, the selecting unit 123 selects the phase differences used to compute the variance of the phase difference at the positions where the variance of the phase difference becomes less than or equal to the threshold value (step S2). Hence, from the data of the phase difference illustrated in FIG. 4A, for example, the data of the variance of the phase difference at the positions where the variance of the phase differences becomes less than or equal to the threshold value is selected, as illustrated in FIG. 4C.

Based on the data of the variance of the phase difference selected by the selecting unit 123, the azimuth angle computing unit 124 selects the first antenna element, the second antenna element, and the third antenna element, and computes the azimuth angle ø from the ratio of the phase difference (the example of the first phase difference) between the signals received by the first antenna element and the second antenna element, and the phase difference (the example of the second phase difference) between the signals received by the first antenna element and the third antenna element (step S3).

Based on the azimuth angle ø computed in step S3, and one of the phase difference (the example of the first phase difference) and the phase difference (the example of the second phase difference) used for the computation in step S3, the elevation angle computing unit 125 computes the elevation angle θ (step S4). Accordingly, the azimuth angle ø and the elevation angle θ are determined by the processes described above, and the series of processes ends.

As described above, according to the present embodiment, the selecting unit 123 selects the phase differences used to compute the variance at the positions where the variance of the phase differences becomes less than or equal to the threshold value, from the variance of the phase difference computed by the variance computing unit 122. In addition, the azimuth angle computing unit 124 selects the first antenna element, the second antenna element, and the third antenna element, based on the data of the phase difference selected by the selecting unit 123, and computes the azimuth angle ø based on the first phase difference and the second phase difference. Further, the elevation angle computing unit 125 computes the elevation angle θ, based on the computed azimuth angle ø, and the first phase difference or the second phase difference.

For this reason, the azimuth angle ø and the elevation angle θ having the high measurement accuracy can be determined even when the multipath occurs.

Accordingly, it is possible to provide the angle measuring device 100 and the angle measuring method having the high angle measurement accuracy, or small angle errors, even when the multipath occurs.

In addition, the azimuth angle computing unit 124 computes the azimuth angle ø, by selecting the first phase difference between the signals received by the first antenna element and the second antenna element, and the second phase difference between the signals received by the first antenna element and the third antenna element, from the phase differences selected by the selecting unit 123. For this reason, the azimuth angle ø can be computed with a small angle error.

Moreover, the elevation angle computing unit 125 computes the elevation angle θ of the smartphone 50, based on the first phase difference or the second phase difference selected by the azimuth angle computing unit 124. Hence, the elevation angle θ can easily be computed, using the first phase difference or the second phase difference utilized to compute the azimuth angle ø.

Further, the variance computing unit 122 is provided to compute the variance of the phase differences of the signals received from smartphone 50 by the plurality of antenna elements, and the selecting unit 123 is provided to select the phase differences with which the variance computed by the variance computing unit 122 becomes less than or equal to the threshold value. Hence, it is possible to select the phase difference with which the computed variance becomes less than or equal to the threshold value, from the phase differences computed by the variance computing unit 122.

The variance computing unit 122 computes the variance of the phase differences of the signals having the plurality of frequencies and received from the smartphone 50 by the plurality of antenna elements, at the plurality of positions having the different distances from the smartphone 50, as the variance of the phase difference of the signals. In addition, because the selecting unit 123 selects the phase differences computed at the plurality of positions respectively having the different distances from the smartphone 50 and the variance less than or equal to the threshold value, the phase differences computed at the positions having long distances from the smartphone 50 and greatly affected by the multipath are excluded from the selection, thereby enabling the azimuth angle ø and the elevation angle θ having the small angle errors to be computed.

The threshold value is a value for reducing an increase of the variance of the phase difference caused by the multipath when the signal transmitted from the smartphone 50 is reflected from the floor F. Hence, it is possible to effectively reduce the effects of the multipath by selecting the phase difference less than or equal to the threshold value.

The antenna device 110 is installed in the upright state on the floor F so that the surface of the antenna device 110 parallel to the XY-plane formed by the X-axis and the Y-axis stands upright with respect to the floor F. For this reason, although the multipath may easily occur, it is possible to reduce the effects of the multipath caused by the reflection from the floor F.

The antenna device 110 can be disposed on the ceiling in the vertical state with respect to the floor F. In this case, the azimuth angle ø and the elevation angle θ of the smartphone 50 with respect to the angle measuring device 100 can be determined, based on the signal received from the smartphone 50 carried by a person passing immediately under the antenna device 110 installed on the ceiling.

The azimuth angle ø is represented using the first antenna element as the origin. The azimuth angle ø is an azimuth angle with respect to the X-axis on the XY-plane including the X-axis and the Y-axis of the XYZ coordinate system including the X-axis, the Y-axis, and the Z-axis. Because the elevation angle θ is an elevation angle with respect to the Z-axis, it is possible to compute an azimuth angle and an elevation angle in a polar coordinate system having an origin that is the same as the origin of the XYZ coordinate system.

Although the variance computing unit 122 computes the variance of the phase difference in the example described above, a distribution of the phase differences may be computed in place of the variance of the phase difference.

Figure 6:
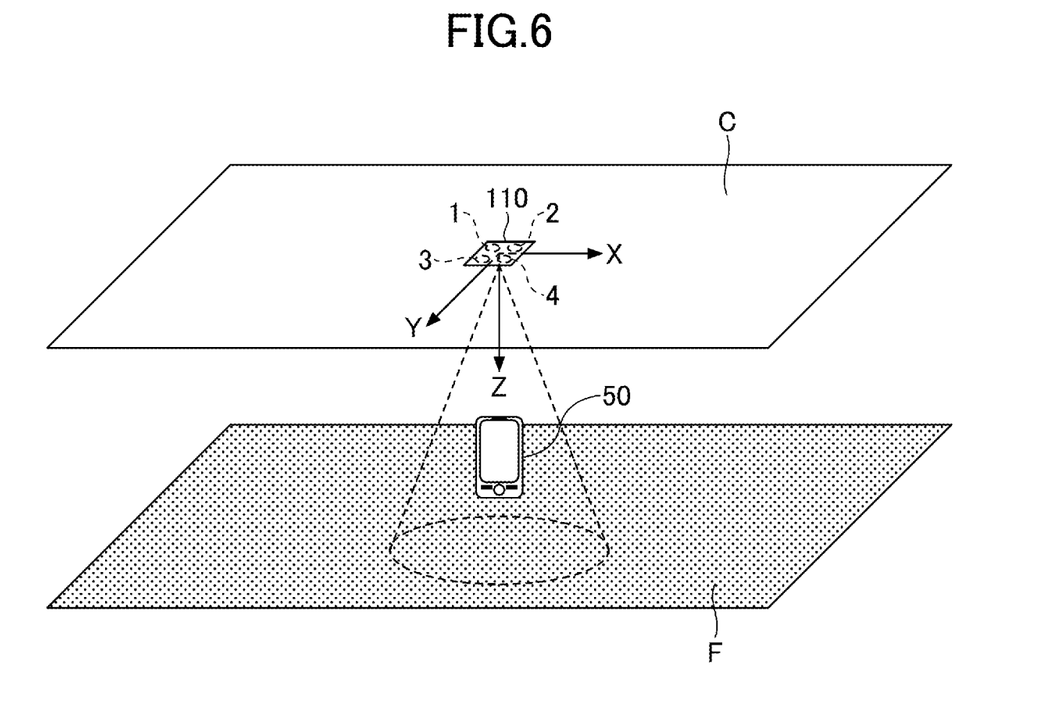
FIG. 6 is a diagram illustrating a modification of an arrangement of the antenna device 110.

Further, the antenna device 110 may have an arrangement illustrated in FIG. 6. FIG. 6 illustrates the arrangement of the antenna device 110 according to a modification of the embodiment. FIG. 6 illustrates the horizontal floor F, and a ceiling C parallel to the floor F. The antenna device 110 is installed in a state where a surface of the antenna device 110 parallel to the XY-plane including the X-axis and the Y-axis is attached to the ceiling C, and the antenna device 110 is located above the floor F. Using the antenna device 110 having this arrangement, it is possible to determine the azimuth angle and the elevation angle of the smartphone 50 under the antenna device 110.

According to the embodiments and modifications described above, it is possible to provide an angle measuring device and an angle measuring method having a high measurement accuracy, even when the multipath occurs.

Although examples of the angle measuring device and the angle measuring method according to the embodiments of the present invention are described heretofore, the present invention is not limited to the specifically disclosed embodiments, and various variations and modifications can be made without departing from the scope of the claims.

Although the first axis and the second axis are perpendicular to each other in the embodiments and modifications described above, the first axis and the second axis may be approximately perpendicular to each other. Alternatively, the first axis and the second axis may extend in non-parallel, mutually different directions.

What is claimed is:

1. An angle measuring device comprising:
   an antenna device configured to receive a signal transmitted from a transmission device, and including a plurality of antenna elements that are equally spaced along a first axis and a second axis, respectively; and
   a processor configured to perform a process including
      selecting a plurality of phase differences with which a variance thereof becomes less than or equal to a predetermined value, from a plurality of phase differences of signals that have a plurality of different frequencies and are received from the transmission device by the plurality of antenna elements,
      computing an azimuth angle of the transmission device from a ratio of a first phase difference and a second phase difference among the phase differences selected by the selecting, wherein the first phase difference is a phase difference between signals received by a first antenna element and a second antenna element located at a predetermined distance from the first antenna element along the first axis, and the second phase difference is a phase difference between signals received by the first antenna element and a third antenna element located at the predetermined distance from the first antenna element along the second axis, and
      computing an elevation angle of the transmission device, based on the azimuth angle computed by the computing the azimuth angle and the first phase difference or the second phase difference.

2. The angle measuring device as claimed in claim 1, wherein the computing the azimuth angle computes the azimuth angle by selecting the first phase difference and the second phase difference from the phase differences selected by the selecting.

3. The angle measuring device as claimed in claim 2, wherein the computing the elevation angle computes the elevation angle, based on the first phase difference or the second phase difference selected by the computing the azimuth angle.

4. The angle measuring device as claimed in claim 1, wherein the processor performs the process further including computing the variance of the phase differences of the signals received from the transmission device by the plurality of antenna elements.

5. The angle measuring device as claimed in claim 4, wherein
   the computing the variance computes the variance of the phase differences of the signals having a plurality of frequencies and received from the transmission device by the plurality of antenna elements.

6. The angle measuring device as claimed in claim 1, wherein the predetermined value is an upper limit value for reducing an increase of the variance of the phase differences caused by a multipath.

7. The angle measuring device as claimed in claim 1, wherein the antenna device is installed in an upright state on a floor so that a surface of the antenna device parallel to a plane including the first axis and the second axis stands upright with respect to the floor.

8. The angle measuring device as claimed in claim 1, wherein the antenna device is installed in a state where a surface of the antenna device parallel to a plane including the first axis and the second axis is attached to a ceiling, and the antenna device is located above a floor.

9. The angle measuring device as claimed in claim 1, wherein the azimuth angle is an azimuth angle with respect to the first axis on a plane including the first axis and the second axis, in a coordinate system including the first axis, the second axis, and a third axis that are perpendicular to one another and having the first antenna element located at an origin, and the elevation angle is an elevation angle with respect to the third axis.

10. The angle measuring device as claimed in claim 1, wherein the computing the azimuth angle selects the first antenna element, the second antenna element, and the third antenna element that receive the signals from which the phase differences selected by the processor are determined, and having a signal reception intensity falling within a predetermined rank from a top rank and generating the first phase difference and the second phase difference, among the plurality of antenna elements.

11. The angle measuring device as claimed in claim 1, wherein the first axis and the second axis are perpendicular to each other, the first antenna element and the second antenna element are adjacent to each other along the first axis, and the first antenna element and the third antenna element are adjacent to each other along the second axis.

12. An angle measuring method to be implemented in an angle measuring device including a computer, and an antenna device having a plurality of antenna elements that are equally spaced along a first axis and a second axis and configured to receive a signal transmitted from a transmission device, the angle measuring method comprising:

selecting, by the computer, a plurality of phase differences from a plurality of phase differences of signals that have a plurality of different frequencies and are received from the transmission device by the plurality of antenna elements, with which a variance of the phase differences becomes less than or equal to a predetermined value;

computing, by the computer, an azimuth angle of the transmission device from a ratio of a first phase difference and a second phase difference among the phase differences selected by the computer, wherein the first phase difference is a phase difference between signals received by a first antenna element and a second antenna element located at a predetermined distance from the first antenna element along the first axis, and the second phase difference is a phase difference between signals received by the first antenna element and a third antenna element located at the predetermined distance from the first antenna element along the second axis; and computing, by the computer, an elevation angle of the transmission device, based on the azimuth angle computed by the azimuth angle computing unit and the first phase difference or the second phase difference.

13. The angle measuring method as claimed in claim 12, wherein the computing the azimuth angle computes the azimuth angle by selecting the first phase difference and the second phase difference from the phase differences selected by the selecting.

14. The angle measuring method as claimed in claim 13, wherein the computing the elevation angle computes the elevation angle, based on the first phase difference or the second phase difference selected by the computing the azimuth angle.

15. The angle measuring method as claimed in claim 12, further comprising:

computing, by the computer, the variance of the phase differences of the signals received from the transmission device by the plurality of antenna elements.

16. The angle measuring method as claimed in claim 15, wherein the computing the variance computes the variance of the phase differences of the signals having a plurality of frequencies and received from the transmission device by the plurality of antenna elements.

* * * * *